United States Patent [19]

Schotthoefer

[11] Patent Number: 5,638,711
[45] Date of Patent: Jun. 17, 1997

[54] SPARE TIRE LOCKING DEVICE

[75] Inventor: Gerald R. Schotthoefer, Dallas, Tex.

[73] Assignee: Adell Corporation, Sunnyvale, Calif.

[21] Appl. No.: 623,916

[22] Filed: Mar. 28, 1996

[51] Int. Cl.$^6$ .......................... B62D 43/04; E05B 65/12
[52] U.S. Cl. .......................... 70/259; 224/42.23; 414/463
[58] Field of Search .................. 70/259, 260; 224/42.21, 224/42.23, 42.25; 414/463, 466

[56] References Cited

U.S. PATENT DOCUMENTS

| | | | |
|---|---|---|---|
| 4,526,021 | 7/1985 | Princell | 70/183 |
| 4,988,023 | 1/1991 | Heathcoat | 224/42.21 |
| 5,077,995 | 1/1992 | Appelbaum | 70/259 |
| 5,199,287 | 4/1993 | McClary | 70/259 |
| 5,330,313 | 7/1994 | Easterwood | 414/463 |
| 5,343,722 | 9/1994 | Richardson | 70/259 |

*Primary Examiner*—Lloyd A. Gall
*Attorney, Agent, or Firm*—H. Dennis Kelly; Timmons & Kelly

[57] ABSTRACT

A pickup truck spare tire is mounted on a hoist having a hoist shaft, accessible through an opening in the rear channel or rear bumper. A winch tube cover is placed over the hoist shaft to allow access to the hoist shaft only through the winch tube cover. An insert is mounted in the rearward end of the winch tube cover and extends through the opening in the rear bumper. An open bore through the insert provides access to the hoist shaft. A lock is temporarily attached to the insert to prevent access to the hoist shaft through the insert.

9 Claims, 4 Drawing Sheets

SPARE TIRE LOCKING DEVICE

BACKGROUND OF THE INVENTION

1. Field of the Invention

This invention relates in general to security devices for securing spare tires. In particular, the invention relates to security devices for securing a spare tire mounted on a hoist having a hoist shaft accessible through an opening in the rear bumper of the pickup.

2. Description of Related Art

U.S. Pat. No. 5,199,287, issued Apr. 6, 1993, to McClary, shows a device for securing a spare tire mounted on a hoist having a hoist shaft accessible through an opening in the bumper. The device includes a locking shaft extending from the end of the hoist shaft to the opening in the bumper. The device also has a padlock inserted through a hole in the locking shaft for preventing the removal of the locking shaft from the hoist shaft.

U.S. Pat. No. 4,988,023, issued Jan. 29, 1991, to Heathcoat, discloses another device for securing a spare tire. The device includes a drive member that is permanently inserted into the end of the hoist shaft. The rear end of the drive member has a hexagonal shape to be engaged by a crank. The hexagonal end of the drive member can be covered by a removable cap that can be locked to the drive member with a key, thus preventing access to the drive member.

SUMMARY OF THE INVENTION

The general object of the locking device of the invention is to prevent the unauthorized removal of a spare tire mounted on a hoist shaft under the rear of a truck. In particular, the object of the invention is to prevent unauthorized rotation of the hoist shaft. This object is accomplished by a locking device having a winch tube cover, an insert in the rearward end of the winch tube cover, and a lock. The winch tube cover is placed over the socket of the hoist shaft to allow access to the socket only through the winch tube cover. The insert extends through an opening in the rear channel or the rear bumper of the truck. The lock is temporarily secured to the insert to prevent access through the insert and the winch tube cover. The locking device may also have a plastic spacer in the forward end of the winch tube cover to keep the metal winch tube cover from hitting against the metal hoist shaft.

The above, as well as additional objects, features, and advantages of the invention will become apparent in the following detailed description.

DESCRIPTION OF THE PREFERRED EMBODIMENT

Figure 1:
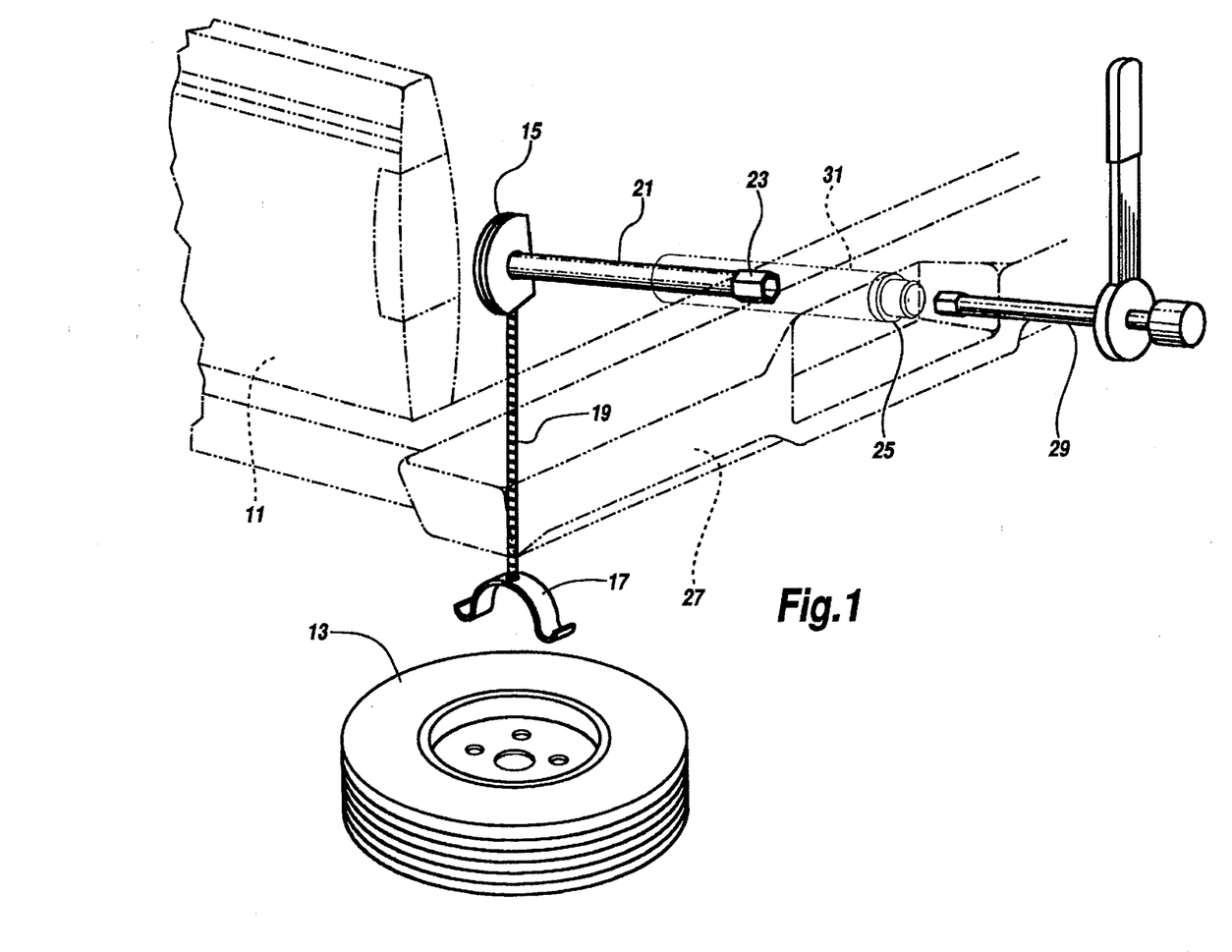
FIG. 1 is a perspective view of the rear end of a truck having a spare tire mounted on a hoist of the type having a hoist shaft accessible through an opening in the rear bumper of the pickup. The locking device of the invention is shown in shadow for clarity.

FIG. 1 illustrates a portion of a typical pickup truck 11 of a recent design. The truck 11 has a spare tire 13, suspended from a hoist 15 on a retainer 17 on the lower end of a cable 19.

A hoist shaft 21 extends from the hoist 15 toward the rear of the truck 11. The hoist shaft 21 is generally cylindrical, with a female hexagonal socket 23 on the rearward end of the hoist shaft 21. The hexagonal socket 23 is aligned with an opening 25 in the rear channel or the rear bumper 27 of the truck 11.

A ratchet 29, or other type of crank, having a male hexagonal end can be used to rotate the hoist shaft 21. The ratchet 29 is passed through the opening 25 in the rear bumper 27 and inserted into the socket 23 on the hoist shaft 21. As the hoist shaft 21 is rotated, the hoist 15 will raise or lower the spare tire 13.

Figure 11:
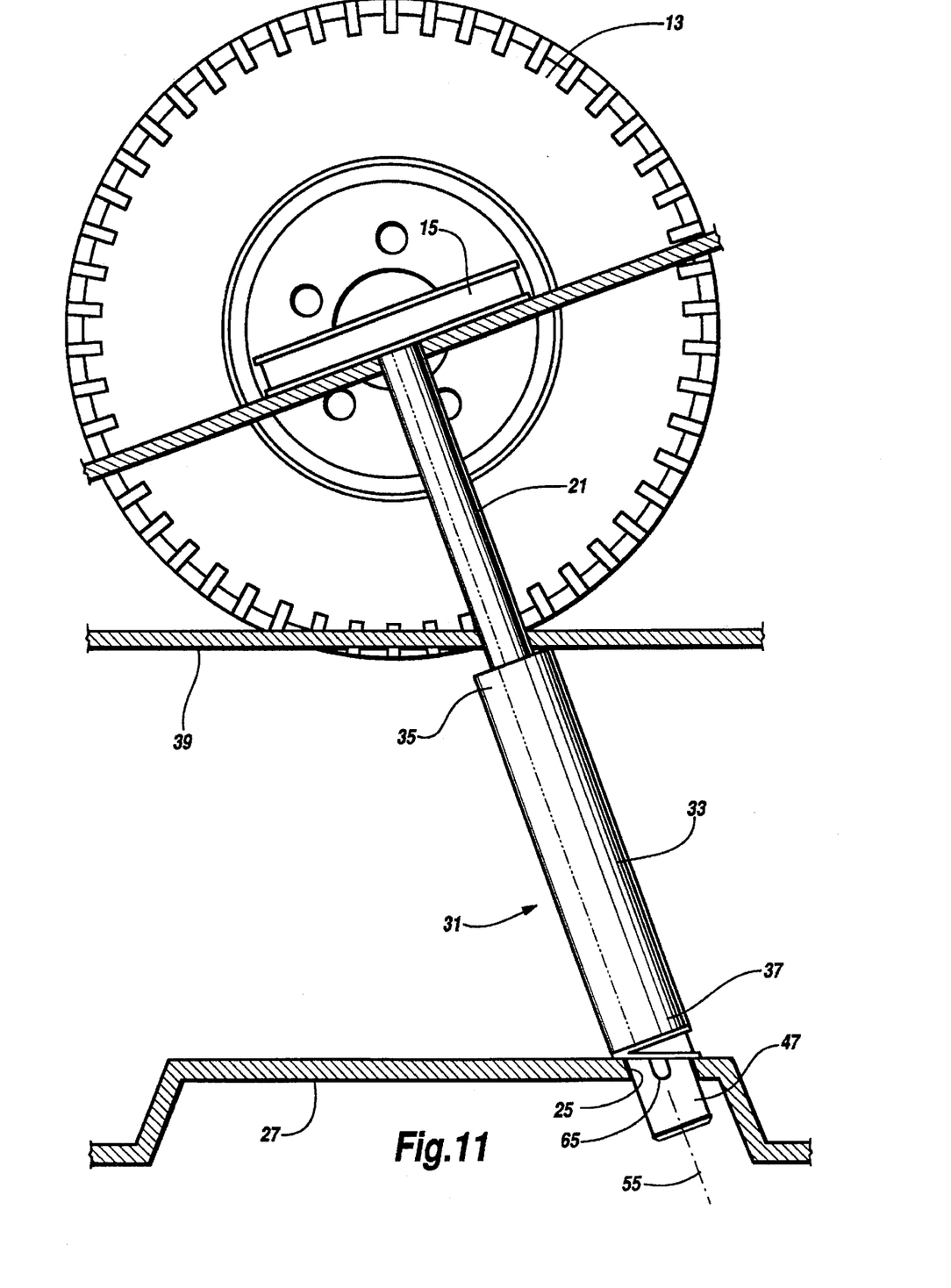
FIG. 11 is a top plan view of a locking device according to the invention.

The locking device 31 of the invention prevents unauthorized access to the hoist shaft 21. The locking device 31 includes a cylindrical winch tube cover 33, having a forward end 35 and a rearward end 37. As shown in FIG. 11, the rearward end 37 of the winch tube cover 33 is located near the rear bumper 27 and the forward end 35 of the winch tube cover 33 is located near a cross beam 39.

Figure 2:
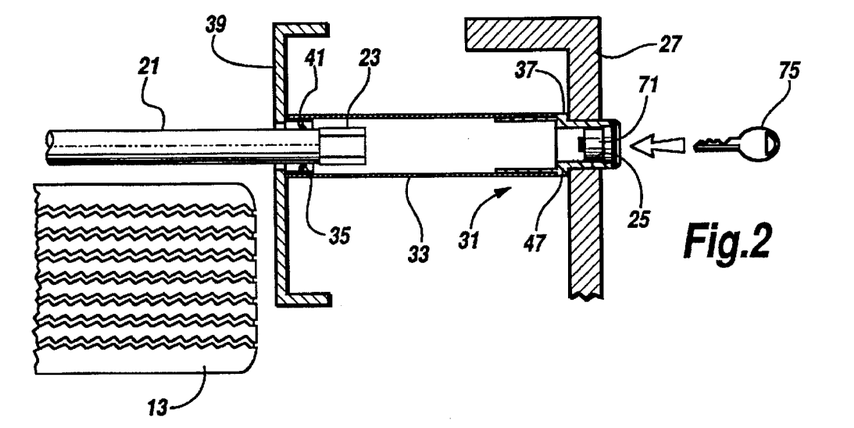
FIG. 2 is a cross sectional side view of a locking device according to the invention, with the lock in place.
Figure 3:
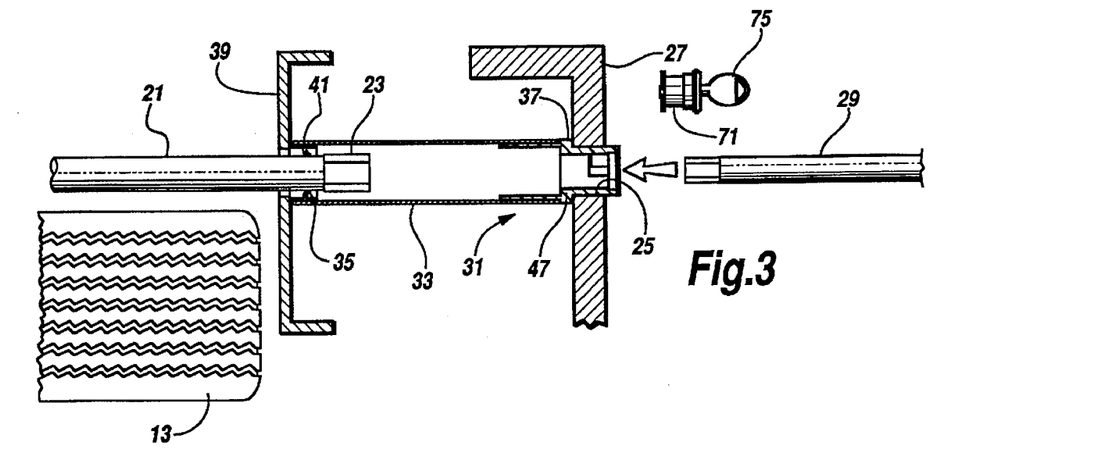
FIG. 3 is a cross sectional side view of a locking device according to the invention, with the lock removed to provide access to the hoist shaft.
Figure 4:
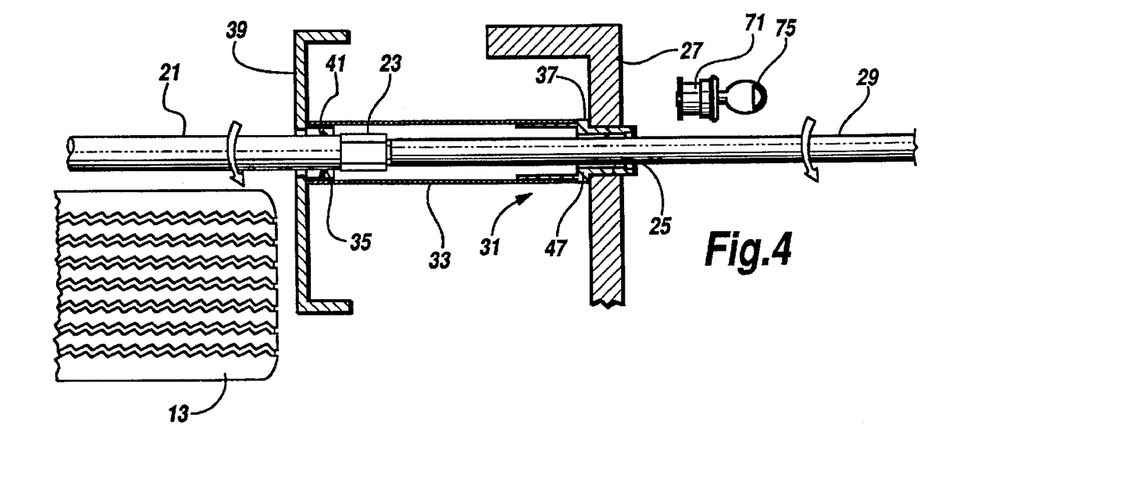
FIG. 4 is a cross sectional side view of a locking device according to the invention, with the lock removed and with a crank engaged with the hoist shaft.

The forward end 35 of the winch tube cover 33 extends over the socket 23 and part of the hoist shaft 21, as shown in FIGS. 2–4. The winch tube cover 33 thus allows access to the socket 23 and the hoist shaft 21 only through the bore of the winch tube cover 33.

The locking device 31 also includes a plastic spacer 41, inserted into the forward end 35 of the winch tube cover 33 for preventing contact between the metal winch tube cover 33 and the metal hoist shaft 21. The spacer 41, shown in detail in FIGS. 5 and 6, has a cylindrical body 43 and a plurality of radially extending fingers 45 that contact the hoist shaft 21. When the locking device 31 is installed onto the hoist shaft 21, the fingers 45 fold back to firmly hold the winch tube cover 33 centered around the hoist shaft 21, as seen in FIGS. 2–4.

Figures 5, 6, 7, 8, 9:
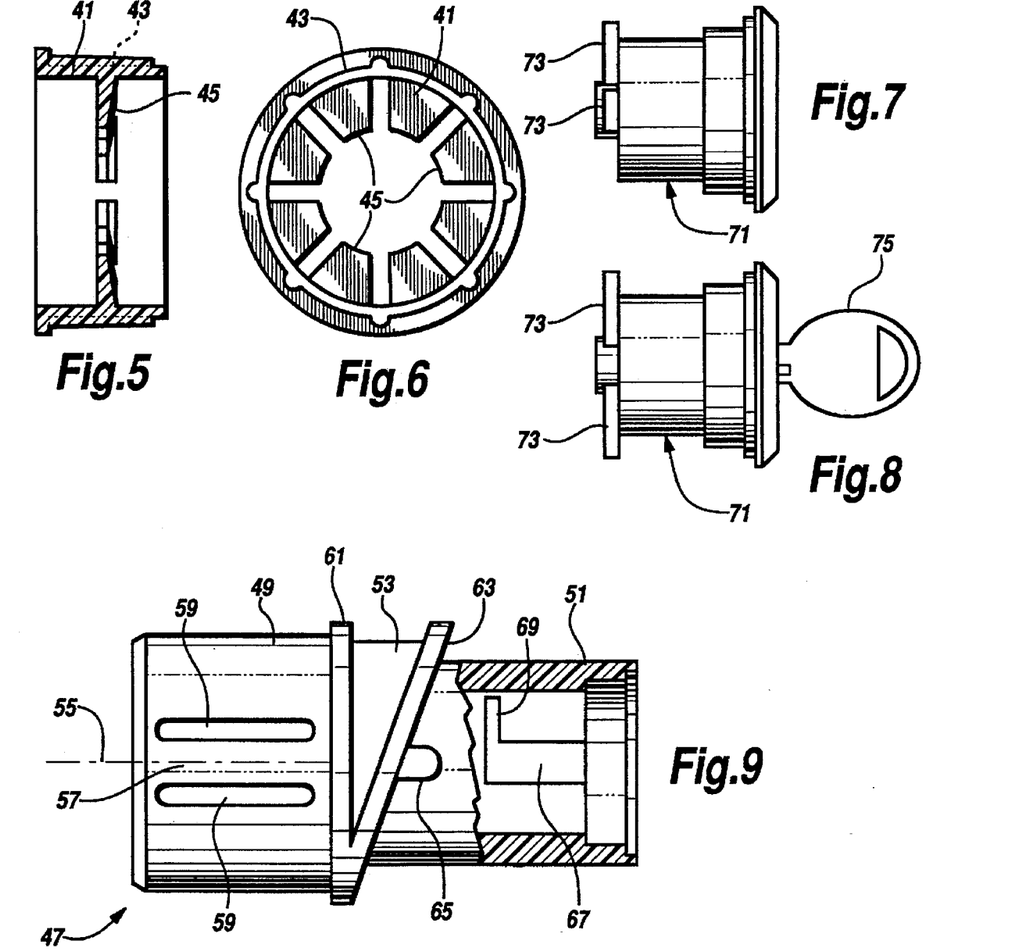
FIG. 5 is a cross sectional side view of a spacer member according to the invention.
FIG. 6 is a rear elevation of the spacer member shown in FIG. 5.
FIG. 7 is a side elevation of a lock according to the invention, with the dogs in the locked position.
FIG. 8 is a side elevation of the lock shown in FIG. 7, with a key inserted into the lock and with the dogs in the unlocked position.
FIG. 9 is a top plan view, partly in cross section, of an insert according to the invention.
Figure 10:
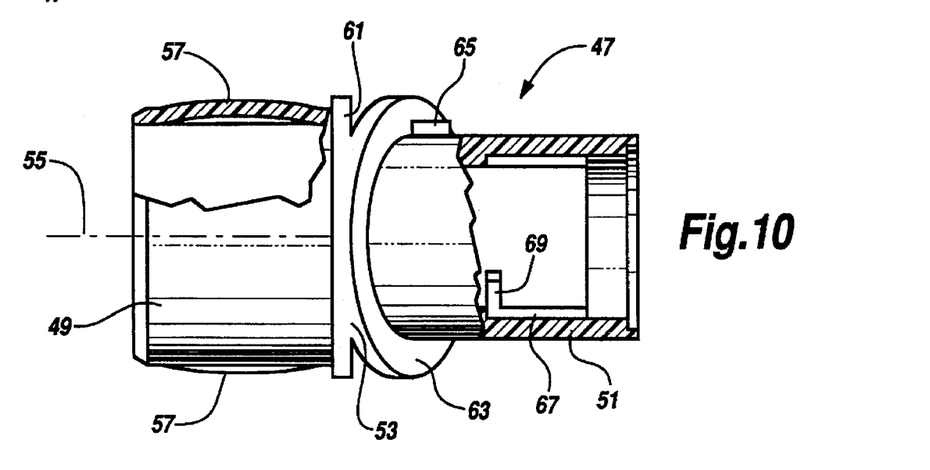
FIG. 10 is a side elevation, partly in cross section of the insert shown in FIG. 9.

The locking device 31 of the invention also includes an insert 47, shown in detail in FIGS. 9 and 10. The insert 47 has three sections: a forward section 49, a rearward section 51, and an intermediate section 53. The three sections are collinear around a longitudinal axis 55.

The forward section 49 is cylindrical and is inserted into the rearward end 37 of the winch tube cover 33, as shown in FIGS. 2–4. The forward section 49 has an open bore to allow the ratchet 29 access to the socket 23 on the hoist shaft 21.

The outer surface of the forward section 49 has an area of expanded circumference 57 for adapting the insert 47 to the inner diameter of the winch tube cover 33. This area of expanded circumference is formed by a parallel pair of slots 59. The forward section 49 may also have a second area of expanded circumference on the opposite side. The areas of expanded circumference also provide a secure press fit in the winch tube cover 33.

The intermediate section 53 of the insert 47 has a forward shoulder 61 and a rearward shoulder 63. The forward shoulder 61 abuts the rearward end 37 of the winch tube cover 33, and the rearward shoulder 63 abuts the rear bumper 27. As shown in FIG. 11, the angle between the longitudinal axis 55 of the insert 47 and the rear bumper 27 is between about sixty-eight and seventy-three degrees. Therefore, there is a angle between the forward shoulder 61 and the rearward shoulder 63 of between about seventeen and twenty-two degrees.

The rearward section 51 is cylindrical and extends through the opening 25 in the rear bumper 27. The inner diameter of the rearward section 51 is large enough to allow the ratchet 29 to pass through to the socket 23 of the hoist shaft 21. A key 65 on the outer surface of the rearward section 51 cooperates with a slot in the rear bumper 27 to properly position the insert 47. The inner surface of the rearward section 51 has a longitudinal slot 67 and a circumferential slot 69.

Finally, the locking device 31 includes a lock 71, shown in detail in FIGS. 7 and 8. The lock 71 fits into the rearward section 51 of the insert 47, as shown in FIG. 2. The lock 71 has three dogs 73 that can be pivoted ninety degrees with a key 75. When the dogs 73 are in the open position, the lock 71 can be inserted into the insert 47. With the key 75, the dogs 73 can then be pivoted into the circumferential slot 69 to secure the lock 71 onto the insert 47. The key 75 can also be used to pivot the dogs 73 back to the open position, so that the lock can be removed from the insert 47.

The use of the locking device 31 of the invention is illustrated in FIGS. 2–4. FIG. 2 shows the lock 71 installed on the insert 47, thus blocking access to the socket 23 on the hoist shaft 21. The key 75 is inserted into the lock 71 and turned to pivot the dogs 73 from the closed position to the open position. Then, as seen in FIG. 3, the lock 71 is removed from the insert 47, allowing access to the hoist shaft 21. The ratchet 29 is inserted through the insert 47 and the winch tube cover 33 to contact the socket 23. The ratchet 29 can then rotate the hoist shaft 21 to lower the spare tire 13.

The locking device 31 of the invention has several advantages over the prior art. The winch tube cover 33 allows access to the hoist shaft 21 only through the winch tube cover 33, and the lock 71 prevents unauthorized access through the winch tube cover 33. Also, the locking device 31 of the invention is inexpensive and the lock 71 is easy to install and to remove.

The invention has been described in only one embodiment. It should be apparent to those skilled in the art that the invention is not so limited, but is susceptible to various changes and modifications without departing from the spirit of the invention.

I claim:

1. A device for locking a spare tire mounted on a hoist having a hoist shaft, the rear end of the hoist shaft being accessible through an opening in a rear bumper, comprising:
   a winch tube cover, having a forward end and a rearward end, wherein the forward end is adapted to be placed over the hoist shaft to allow access to the hoist shaft only through the winch tube cover;
   an insert mounted in the rearward end of the winch tube cover and adapted to extend through the opening in the rear bumper, and having an open bore to provide access to the hoist shaft; and
   a lock for temporary attachment to the insert to prevent access to the hoist shaft through the insert.

2. A device as recited in claim 1, further comprising a spacer inserted into the forward end of the winch tube cover for preventing contact between the winch tube cover and the hoist shaft.

3. A device as recited in claim 2, wherein the spacer has a cylindrical body and a plurality of radially extending fingers that contact the hoist shaft.

4. A device as recited in claim 1, wherein the insert further comprises:
   a cylindrical forward section inserted into the rearward end of the winch tube cover;
   a cylindrical rearward section adapted to extend through the opening in the rear bumper; and
   an intermediate section, connected between the forward section and the rearward section.

5. A device as recited in claim 4, wherein a longitudinal axis of the insert is nonlinear with the rear bumper.

6. A device as recited in claim 5, wherein the angle between the longitudinal axis of the insert and the rear bumper is between sixty-eight and seventy-three degrees.

7. A device as recited in claim 5, wherein the intermediate section has a first shoulder for abutting the rearward end of the winch tube cover and a second shoulder for abutting the rear bumper.

8. A device as recited in claim 5, wherein the forward section has an area of expanded circumference for adapting the insert to the inner diameter of the winch tube cover.

9. A device as recited in claim 8, wherein the area of expanded circumference is formed by a parallel pair of slots.

* * * * *

(12) REEXAMINATION CERTIFICATE (4352nd)
United States Patent
Schotthoefer (10) Number: US 5,638,711 C1
(45) Certificate Issued: May 15, 2001

(54) SPARE TIRE LOCKING DEVICE

(75) Inventor: Gerald R. Schotthoefer, Dallas, TX (US)

(73) Assignee: Trident Laboratories, Inc., Sunnyvale, TX (US)

Reexamination Request:
No. 90/005,730, May 17, 2000

Reexamination Certificate for:
Patent No.: 5,638,711
Issued: Jun. 17, 1997
Appl. No.: 08/623,916
Filed: Mar. 28, 1996

(51) Int. Cl.$^7$ ............................ B62D 43/04; E05B 65/12
(52) U.S. Cl. ........................ 70/259; 224/42.23; 414/463
(58) Field of Search .................. 70/259, 260; 224/42.21, 224/42.23, 42.25; 414/463, 466

(56) References Cited

U.S. PATENT DOCUMENTS

| | | | |
|---|---|---|---|
| 4,526,021 | * | 7/1985 | Princell .................................. 70/183 |
| 4,988,023 | * | 1/1991 | Heathcoat .......................... 224/42.21 |
| 5,077,995 | * | 1/1992 | Appelbaum ............................ 70/259 |
| 5,199,287 | * | 4/1993 | McClary ................................ 70/259 |
| 5,330,313 | * | 7/1994 | Easterwood .......................... 414/463 |
| 5,343,722 | * | 9/1994 | Richardson ............................ 70/259 |
| 5,758,523 | | 6/1998 | Kozlowski, Jr. et al. ............. 70/259 |

* cited by examiner

Primary Examiner—Lloyd A. Gall (57) ABSTRACT

A pickup truck spare tire is mounted on a hoist having a hoist shaft, accessible through an opening in the rear channel or rear bumper. A winch tube cover is placed over the hoist shaft to allow access to the hoist shaft only through the winch tube cover. An insert is mounted in the rearward end of the winch tube cover and extends through the opening in the rear bumper. An open bore through the insert provides access to the hoist shaft. A lock is temporarily attached to the insert to prevent access to the hoist shaft through the insert.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

New claims 10–25 are added and determined to be patentable.

*10. A device for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the lock is generally cylindrical in shape and the axis of the lock is substantially collinear with the longitudinal axis of the insert.*

*11. A device as recited in claim 10, further comprising a spacer inserted into the forward end of the winch tube cover for preventing contact between the winch tube cover and the hoist shaft.*

*12. A device as recited in claim 11, wherein the spacer has a cylindrical body and a plurality of radially extending fingers that contact the hoist shaft.*

*13. A device as recited in claim 10, wherein the insert further comprises:*

*a cylindrical forward section inserted into the rearward end of the winch tube cover;*

*a cylindrical rearward section adapted to extend through the opening in the rear bumper; and*

*an intermediate section, connected between the forward section and the rearward section.*

*14. A device as recited in claim 10, wherein the angle between the longitudinal axis of the insert and the rear bumper is between sixty-eight and seventy-three degrees.*

*15. A device as recited in claim 13, wherein the intermediate section has a first shoulder for abutting the rearward end of the winch tube cover and a second shoulder for abutting the rear bumper.*

*16. A device as recited in claim 13, wherein the forward section has an area of expanded circumference for adapting the insert to the inner diameter of the winch tube cover.*

*17. A device as recited in claim 16, wherein the area of expanded circumference is formed by a parallel pair of slots.*

*18. A device for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the insert has a shoulder for preventing the insert from being moved away from the hoist.*

*19. A device as recited in claim 18, wherein the insert also has a shoulder for preventing the insert from being moved toward the hoist.*

*20. A device as recited in claim 18, wherein the lock is generally cylindrical in shape and the axis of the lock is substantially collinear with the longitudinal axis of the insert.*

*21. A device as recited in claim 18, wherein the lock is generally cylindrical in shape and the axis of the lock is substantially collinear with the longitudinal axis of the insert and wherein the insert also has a shoulder for preventing the insert from being moved toward the hoist.*

*22. A device as recited in claim 21, wherein the angle between the longitudinal axis of the insert and the rear bumper is between sixty-eight and seventy-three degrees.*

*23. A device as recited in claim 21, further comprising a spacer inserted into the forward end of the winch tube cover for preventing contact between the winch tube cover and the hoist shaft.*

*24. A device as recited in claim 19, further comprising a spacer inserted into the forward end of the winch tube cover for preventing contact between the winch tube cover and the hoist shaft.*

*25. A device as recited in claim 24, wherein the angle between the longitudinal axis of the insert and the rear bumper is between sixty-eight and seventy-three degrees.*

* * * * *

(12) EX PARTE REEXAMINATION CERTIFICATE (6595th)
United States Patent
Schotthoefer (10) Number: US 5,638,711 C2
(45) Certificate Issued: Dec. 30, 2008

(54) SPARE TIRE LOCKING DEVICE (75) Inventor: Gerald R. Schotthoefer, Dallas, TX (US)

(73) Assignee: Trident Laboratories, Inc., Sunnyvale, TX (US)

Reexamination Request:
No. 90/006,167, Dec. 21, 2001

Reexamination Certificate for:
Patent No.: 5,638,711
Issued: Jun. 17, 1997
Appl. No.: 08/623,916
Filed: Mar. 28, 1996

Reexamination Certificate C1 5,638,711 issued May 15, 2001

(51) Int. Cl.
*B62D 43/04* (2006.01)
*E05B 65/12* (2006.01)

(52) U.S. Cl. .................. 70/259; 224/42.23; 414/463
(58) Field of Classification Search .................. None
See application file for complete search history.

(56) References Cited

U.S. PATENT DOCUMENTS

| | | |
|---|---|---|
| 485,115 A | 10/1892 | Rusgrove |
| 1,177,767 A | 4/1916 | Eggleston |
| 1,384,384 A | 7/1921 | Dow |
| 1,438,394 A | 12/1922 | Packer |
| 1,464,908 A | 8/1923 | Kettering ............ 70/183 |
| 1,635,229 A | 7/1927 | Sokolov |
| 1,741,314 A | 12/1929 | Johnson |
| 1,805,779 A | 5/1931 | Metz |
| 1,821,130 A | 9/1931 | Wharam |
| 1,837,683 A | 12/1931 | Skaggs ............ 70/260 |
| 1,853,476 A | 4/1932 | Van Ranst |
| 1,892,419 A | 12/1932 | Best |
| 1,931,654 A | 10/1933 | Haseltine |
| 1,942,176 A | 1/1934 | Lowe ............ 70/90 |
| 1,983,767 A | 12/1934 | Mueller |

(Continued)

FOREIGN PATENT DOCUMENTS

| | | | |
|---|---|---|---|
| CA | 902011 | 6/1972 | ............ 70/259 |
| CA | 968319 | 5/1975 | ............ 224/28 |
| CA | 978765 | 12/1975 | ............ 70/49 |
| DE | 812290 | 8/1951 | ............ 70/454 |
| DE | 867208 | 2/1953 | ............ 70/454 |
| DE | 1014447 | 8/1957 | ............ 414/466 |
| FR | 621667 | 2/1927 | ............ 70/259 |
| FR | 2445880 | 9/1980 | ............ 70/454 |
| GB | 25058 | of 1913 | |
| GB | 265943 | 9/1927 | ............ 70/259 |
| GB | 1274286 | 5/1972 | ............ 70/259 |
| GB | 1518334 | 7/1978 | ............ 70/451 |
| GB | 2072109 A | 9/1981 | |
| GB | 2227787 | 8/1990 | ............ 70/370 |
| IT | 414845 | 8/1946 | ............ 70/259 |
| JP | 0234077 | 11/1985 | ............ 224/42.23 |
| WO | 8301645 | 5/1983 | ............ 70/2 |

OTHER PUBLICATIONS

Ford Aerostar, Ranger Explorer 1994 Body/Chasis Service Manual; Aug. 1993, pp. 00–02–6 through 00–02–12; Ford Technical Publications Department; U.S.A.
1992 Chevrolet Owner's Manual C?K Pickup—front and back cover, pp. 0–1, 0–3, 5–18, 5–19, 5–20, 5–21, 5–30 and 5–31.
1992 Chevrolet Truck Service Manual.

*Primary Examiner*—Andres Kashnikow (57) ABSTRACT

A pickup truck spare tire is mounted on a hoist having a hoist shaft, accessible through an opening in the rear channel or rear bumper. A winch tube cover is placed over the hoist shaft to allow access to the hoist shaft only through the winch tube cover. An insert is mounted in the rearward end of the winch tube cover and extends through the opening in the rear bumper. An open bore through the insert provides access to the hoist shaft. A lock is temporarily attached to the insert to prevent access to the hoist shaft through the insert.

U.S. PATENT DOCUMENTS

| | | | |
|---|---|---|---|
| 2,131,746 A | 10/1938 | Morrison | |
| 2,243,789 A | 5/1941 | Benson | |
| 2,325,848 A | 8/1943 | Gildea | |
| 2,328,301 A | 8/1943 | Shaw | 70/259 |
| 2,659,229 A | 11/1953 | Skillman | 70/259 |
| 2,661,405 A | 12/1953 | Western | |
| 2,688,372 A | 9/1954 | Walker | |
| 2,775,358 A | 12/1956 | Renouf | |
| 3,372,821 A | 3/1968 | Podhajsky | 214/451 |
| 3,390,864 A | 7/1968 | Searcy | |
| 3,395,819 A | 8/1968 | Fruetel | |
| 3,431,756 A | 3/1969 | Fenell | 70/259 |
| 3,513,673 A | 5/1970 | Trainor | 70/259 |
| 3,534,570 A | 10/1970 | Mauro | 70/167 |
| 3,539,152 A | 11/1970 | Paul | 254/166 |
| 3,542,413 A | 11/1970 | Hardison | 294/86 |
| 3,554,397 A | 1/1971 | Cluff | 214/451 |
| 3,734,323 A | 5/1973 | Price | 214/451 |
| 3,756,047 A | 9/1973 | Mulberry | 70/164 |
| 3,790,012 A | 2/1974 | Hrivnyak | |
| 3,833,266 A | 9/1974 | Lanne | 301/37 AT |
| 3,856,167 A | 12/1974 | Yasue | 214/451 |
| 3,865,264 A | 2/1975 | Kuhns | 214/451 |
| 3,874,536 A | 4/1975 | Watanabe | |
| 3,884,057 A | 5/1975 | Maurer | 70/259 |
| 3,918,599 A | 11/1975 | Porter | 214/454 |
| 3,940,959 A | 3/1976 | Anderson | 40/259 |
| 3,952,894 A | 4/1976 | Mendez | 214/451 |
| 3,983,726 A | 10/1976 | Rausch | 70/164 |
| 4,024,740 A | 5/1977 | Di Giovanni | 70/175 |
| 4,057,985 A | 11/1977 | Stahl | 70/231 |
| 4,059,197 A | 11/1977 | Iida | 214/451 |
| 4,076,158 A | 2/1978 | Barr | 224/42.25 |
| 4,080,811 A | 3/1978 | Nielsen, Jr. | 70/164 |
| 4,094,173 A | 6/1978 | Brown | 70/237 |
| 4,152,018 A | 5/1979 | Cantrell | 292/305 |
| 4,249,682 A | 2/1981 | Yasue | 224/42.23 |
| 4,282,995 A | 8/1981 | Austin | 224/42.23 |
| 4,308,733 A | 1/1982 | Tampa | 70/259 |
| 4,377,366 A | 3/1983 | Hamlyn | 414/466 |
| 4,438,642 A | 3/1984 | De Jong | 70/232 |
| 4,492,506 A | 1/1985 | Hoagland | 414/463 |
| 4,522,325 A | 6/1985 | McMillan | 224/42.21 |
| 4,526,021 A | 7/1985 | Princell | 70/183 |
| 4,535,973 A | 8/1985 | Dorr | 254/323 |
| 4,537,555 A | 8/1985 | Combs | 414/463 |
| 4,574,602 A | 3/1986 | Furuse | 70/232 |
| 4,600,352 A | 7/1986 | Ivan | 414/463 |
| 4,613,273 A | 9/1986 | Wagner | 414/463 |
| 4,693,453 A | 9/1987 | Ivan | 254/323 |
| 4,732,019 A | 3/1988 | Tolar | 70/203 |
| 4,736,603 A | 4/1988 | Brushaber | 70/232 |
| 4,751,833 A | 6/1988 | Stumph | 70/259 |
| 4,765,164 A | 8/1988 | Prince | 70/259 |
| 4,768,361 A | 9/1988 | Derman | 70/259 |
| 4,794,771 A | 1/1989 | Princell | 70/259 |
| 4,818,032 A | 4/1989 | Thomas | 301/37 |
| 4,848,113 A | 7/1989 | Parks | 70/259 |
| 4,862,716 A | 9/1989 | Derman | 70/166 |
| 4,869,084 A | 9/1989 | Mack | 70/259 |
| 4,873,851 A | 10/1989 | Arnett | 70/259 |
| 4,915,358 A | 4/1990 | Stallings | 254/323 |
| 4,988,023 A | 1/1991 | Heathcoat | 224/42.21 |
| 5,060,912 A | 10/1991 | Guarr | 254/323 |
| 5,077,995 A | 1/1992 | Applebaum | 70/259 |
| 5,102,022 A | 4/1992 | Knezovich | 224/42.25 |
| 5,199,287 A | 4/1993 | McClary | 70/259 |
| 5,211,043 A | 5/1993 | Langdon | 70/259 |
| 5,251,876 A | 10/1993 | Stallings | 254/323 |
| 5,330,313 A | 7/1994 | Easterwood | 414/463 |
| 5,343,722 A | 9/1994 | Richardson | 70/259 |
| 5,426,963 A | 6/1995 | Tafoya | 70/259 |
| 5,475,995 A | 12/1995 | Livingston | 70/259 |
| 5,477,711 A | 12/1995 | Oliveri | 70/369 |
| 5,487,288 A | 1/1996 | Frantz | 70/259 |
| 5,582,048 A | 12/1996 | Schotthoefer | 70/259 |
| 5,638,710 A | 6/1997 | Howard | 70/259 |
| 5,681,137 A | 10/1997 | Stallings | 414/463 |
| 5,689,981 A | 11/1997 | DeLuca | 70/226 |
| 5,758,523 A | 6/1998 | Kozlowski | 70/259 |
| 5,802,895 A | 9/1998 | Osgood | 70/259 |
| 5,836,182 A | 11/1998 | Schotthoefer | 70/259 |
| 5,943,887 A | 8/1999 | Kozlowski | 70/259 |
| 5,960,654 A | 10/1999 | Stanalajczo | 70/259 |
| 6,047,574 A | 4/2000 | Kozlowski | 70/259 |
| 6,067,825 A | 5/2000 | Galgovich | 70/259 |
| 6,164,100 A | 12/2000 | Schotthoefer | 70/259 |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4–6, 10, 13 and 18–21 are cancelled.

Claims 2, 7, 8, 11, 15, 16, 23 and 24 are determined to be patentable as amended.

Claims 3, 9, 12, 14, 17, 22 and 25, dependent on an amended claim, are determined to be patentable.

New claims 26–30 are added and determined to be patentable.

2. A device [as recited in claim 1, further comprising] *for locking a spare tire mounted on a hoist having a hoist shaft, the rear end of the hoist shaft being accessible through an opening in a rear bumper, comprising:*
  *a winch tube cover, having a forward end and a rearward end, wherein the forward end is adapted to be placed over the hoist shaft to allow access to the hoist shaft only through the winch tube cover;*
  *an insert mounted in the rearward end of the winch tube cover and adapted to extend through the opening in the rear bumper, and having an open bore to provide access to the hoist shaft;*
  *a lock for temporary attachment to the insert to prevent access to the hoist shaft through the insert; and*
  a spacer inserted into the forward end of the winch tube cover for preventing contact between the winch tube cover and the hoist shaft.

7. A device [as recited in claim 5] *for locking a spare tire mounted on a hoist having a hoist shaft, the rear end of the hoist shaft being accessible through an opening in a rear bumper, comprising:*
  *a winch tube cover, having a forward end and a rearward end, wherein the forward end is adapted to be placed over the hoist shaft to allow access to the hoist shaft only through the winch tube cover;*
  *an insert mounted in the rearward end of the winch tube cover and adapted to extend through the opening in the rear bumper, and having an open bore to provide access to the hoist shaft; and*
  *a lock for temporary attachment to the insert to prevent access to the hoist shaft through the insert, wherein the insert further comprises a cylindrical forward section inserted into the rearward end of the winch tube cover, a cylindrical rearward section adapted to extend through the opening in the rear bumper; and*
  *an intermediate section, connected between the forward section and the rearward section, and wherein a longitudinal axis of the insert is nonlinear with the rear bumper, and,* wherein the intermediate section has a first shoulder for abutting the rearward end of the winch tube cover and a second shoulder for abutting the rear bumper.

8. A device [as recited in claim 5] *for locking a spare tire mounted on a hoist having a hoist shaft, the rear end of the hoist shaft being accessible through an opening in a rear bumper, comprising:*
  *a winch tube cover, having a forward end and a rearward end, wherein the forward end is adapted to be placed over the hoist shaft to allow access to the hoist shaft only through the winch tube cover;*
  *an insert mounted in the rearward end of the winch tube cover and adapted to extend through the opening in the rear bumper, and having an open bore to provide access to the hoist shaft; and*
  *a lock for temporary attachment to the insert to prevent access to the hoist shaft through the insert, wherein the insert further comprises a cylindrical forward section inserted into the rearward end of the winch tube cover, a cylindrical rearward section adapted to extend through the opening in the rear bumper; and*
  *an intermediate section, connected between the forward section and the rearward section, and wherein a longitudinal axis of the insert is nonlinear with the rear bumper, and,* wherein the forward section has an area of expanded circumference for adapting the insert to the inner diameter of the winch tube cover.

11. A device [as recited in claim 10] *for locking a spare tire mounted on a hoist having a hoist shaft, the rear end of the hoist shaft being accessible through an opening in a rear bumper, comprising:*
  *a winch tube cover, having a forward end and a rearward end, wherein the forward end is adapted to be placed over the hoist shaft to allow access to the hoist shaft only through the winch tube cover;*
  *an insert mounted in the rearward end of the winch tube cover and adapted to extend through the opening in the rear bumper, and having an open bore to provide access to the hoist shaft; and*
  *a lock for temporary attachment to the insert to prevent access to the hoist shaft through the insert, wherein the lock is generally cylindrical in shape and the axis of the lock is substantially collinear with the longitudinal axis of the insert,* further comprising a spacer inserted into the forward end of the winch tube cover for preventing contact between the winch tube cover and the hoist shaft.

15. A device [as recited in claim 13] *for locking a spare tire mounted on a hoist having a hoist shaft, the rear end of the hoist shaft being accessible through an opening in a rear bumper, comprising:*
  *a winch tube cover, having a forward end and a rearward end, wherein the forward end is adapted to be placed over the hoist shaft to allow access to the hoist shaft only through the winch tube cover;*
  *an insert mounted in the rearward end of the winch tube cover and adapted to extend through the opening in the rear bumper, and having an open bore to provide access to the hoist shaft wherein the insert further comprises:*
    *a cylindrical forward section inserted into the rearward end of the winch tube cover;*
    *a cylindrical rearward section adapted to extent through the opening in the rear bumper; and*
    *an intermediate section, connected between the forward section and the rearward section; and* a lock for temporary attachment to the insert to prevent access to the hoist shaft through the insert, wherein the lock is generally cylindrical in shape and the axis of the lock is substantially collinear with the longitudinal axis of the insert, wherein the intermediate section has a first shoulder for abutting the rearward end of the winch tube cover and a second shoulder for abutting the rear bumper.

16. A device [as recited in claim 13] *for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft wherein the insert further comprises:*

*a cylindrical forward section inserted into the rearward end of the winch tube cover;*

*a cylindrical rearward section adapted to extent through the opening in the rear bumper; and*

*an intermediate section, connected between the forward section and the rearward section; and*

*a lock for temporary attachment to the insert to prevent access to the hoist shaft through the insert, wherein the lock is generally cylindrical in shape and the axis of the lock is substantially collinear with the longitudinal axis of the insert, wherein the forward section has an area of expanded circumference for adapting the insert to the inner diameter of the winch tube cover.*

23. A device [as recited in claim 21] *for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the insert has a shoulder for preventing the insert from being moved away from the hoist, wherein the lock is generally cylindrical in shape and the axis of the lock is substantially collinear with the longitudinal axis of the insert and wherein the insert also has a shoulder for preventing the insert from being moved toward the hoist, further comprising a spacer inserted into the forward end of the winch tube cover for preventing contact between the winch tube cover and the hoist shaft.*

24. A device [as recited in claim 19] *for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the insert has a shoulder for preventing the insert from being moved away from the hoist, wherein the insert also has a shoulder for preventing the insert from being moved toward the hoist, further comprising a spacer inserted into the forward end of the winch tube cover for preventing contact between the winch tube cover and the hoist shaft.*

26. *A device for locking a spare tire mounted on a hoist having a hoist shaft, the rear end of the hoist shaft being accessible through an opening in a rear bumper, comprising:*

*a winch tube cover, having a forward and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the lock is generally cylindrical in shape and the axis of the lock is substantially collinear with the longitudinal axis of the insert, wherein the angle between the longitudinal axis of the insert and the rear bumper is between sixty-eight and seventy-three degrees and wherein the insert has a shoulder for preventing the insert from being moved toward the hoist.*

27. *A device as recited in claim 26, wherein the insert has a second shoulder for abutting the rear bumper.*

28. *A device as recited in claim 15, wherein the angle between the longitudinal axis of the insert and the rear bumper is between sixty-eight and seventy-three degrees.*

29. *A device for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed over the hoist shaft to allow access to the hoist shaft only through the winch tube cover;*

*an insert mounted in the rearward end of the winch tube cover and adapted to extend through the opening in the rear bumper, and having an open bore to provide access to the hoist shaft; and*

*a lock for temporary attachment to the insert to prevent access to the hoist shaft through the insert, wherein the insert has a shoulder for preventing the insert from being moved away from the hoist, wherein the lock is generally cylindrical in shape and the axis of the lock is substantially collinear with the longitudinal axis of the insert and wherein the angle between the longitudinal axis of the insert and the rear bumper is between sixty-eight and seventy-three degrees.*

30. *A device for locking a spare tire mounted on a hoist having a hoist shaft, the rear end of the hoist shaft being accessible through an opening in a rear bumper, comprising:*

*a winch tube cover, having a forward end and a rearward end, wherein the forward end is adapted to be placed* over the hoist shaft to allow access to the hoist shaft only through the winch tube cover;

an insert mounted in the rearward end of the winch tube cover and adapted to extend through the opening in the rear bumper, and having an open bore to provide access to the hoist shaft; and a lock for temporary attachment to the insert to prevent access to the hoist shaft through the insert, wherein the lock is generally cylindrical in shape and the axis of the lock is substantially collinear with the longitudinal axis of the insert, wherein the insert further comprises:

a cylindrical forward section inserted into the rearward end of the winch tube cover;

a cylindrical rearward section adapted to extend through the opening in the rear bumper;

an intermediate section, connected between the forward section and the rearward section, and wherein the angle between the longitudinal axis of the insert and the rear bumper is between sixty-eight and seventy-three degrees, wherein the intermediate secton of the insert has a first shoulder for abutting the rearward end of the winch tube cover, and a shoulder for preventing the insert from being moved away form the hoist.

\* \* \* \* \*